3,296,278
CYCLOPENTANOPHENANTHRENE DERIVATIVES AND PROCESS
Alexander D. Cross, Mexico City, Mexico, assignor to Syntex Corporation, Panama, Panama, a corporation of Panama
No Drawing. Filed Nov. 16, 1964, Ser. No. 411,620
Claims priority, application Mexico, Feb. 12, 1964, 75,789
13 Claims. (Cl. 260—343.2)

The present invention relates to novel cyclopentanophenanthrene derivatives and to a process for the obtainment thereof.

More particularly, the present invention relates to novel 4-oxa-19-nor-$\Delta^{1,5(10)}$-androstadien-17β-ol-3-one and 4-oxa-19-nor-$\Delta^{1,5(10),9(11)}$-androstatrien-17β-ol-3-one.

The compounds of the present invention are represented by the following formula:

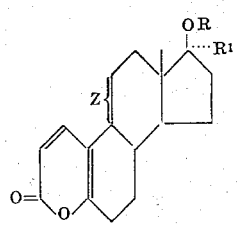

In the above formula, R represents hydrogen, a tetrahydropyran-2-yl group or a hydrocarbon carboxylic acyl group of less than 12 carbon atoms; $R^1$ represents hydrogen, a lower alkyl, a lower alkenyl or a lower alkinyl; and Z represents a saturated linkage or a double bond between C–9 and C–11.

The aforementioned acyl group is derived from hydrocarbon carboxylic acids containing less than 12 carbon atoms which may be saturated or unsaturated, of straight, branched, cyclic or cyclicaliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by the above formula are anabolic agents, have anti-androgenic properties and are useful in fertility control, and they may be administered by oral route.

The novel compounds of the present invention may be prepared by the procedure represented by the following equation:

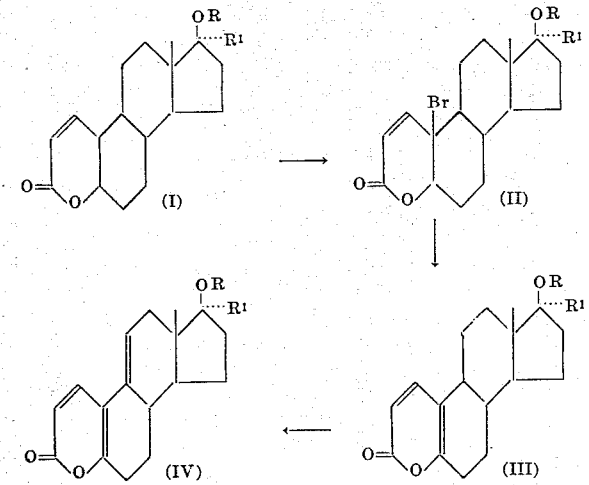

In the above formulate, R and $R^1$ have the same meaning as previously described.

In accordance with the above equation, the starting compound which is 4-oxa-19-nor-$\Delta^1$-5α-androsten-17β-ol-3-one or a derivative thereof (I) is treated with approximately 1 molar equivalent of an N-bromoimide, such as N-bromosuccinimide, in an inert solvent, for example carbon tetrachloride, preferably at reflux temperature during approximately 1.5 hours, thus giving the corresponding 10β-bromo-derivative (II), which, upon mild alkaline treatment, for example in a mixture of calcium carbonate-dimethyl-formamide during approximately 30 minutes, at reflux temperature, produces the corresponding 4-oxa-19-nor-$\Delta^{1,5(10)}$-androstadien-17β-ol-3-one derivative (III). The latter compound is treated with a quinone of a reduction potential of less than —0.5 v. such as chloroanil or 2,3-dichloro-5,6-dicyano-1,4-benzoquinone in an inert solvent such as dioxane, preferably at reflux temperature during the period of time of the order of 10 hours, thus giving the corresponding 4-oxa-19-nor-$\Delta^{1,5(10),9(11)}$-androstatrien-17β-ol-3-one derivative (IV).

The compounds of the present invention having a double bond between carbon atoms 5 and 10 and a free hydroxyl at 17 (III and IV; R=H) are conventionally treated with dihydropyran in the presence of p-toluenesulfonic acid during approximately 4 days to give the corresponding 17-(tetrahydropyran-2-yl) ethers (III and IV; R=tetrahydropyran-2-yl).

The compounds of the present invention having the double bond between C–5 and C–10 and a secondary hydroxyl at C–17 (III and IV; R=$R^1$=H) are conventionally esterified in pyridine with a suitable acylating agent, such as the anhydride or chloride of an acid of the type described above, to give the corresponding 17-esters (III and IV; R=acyl; $R^1$=H).

The compounds of the present invention having a double bond between C–5 and C–10 and a tertiary hydroxyl at C–17 (III and IV; R=H, $R^1 \neq H$) are conventionally acylated in the presence of p-toluenesulfonic acid with the anhydride of an acid of the type described hereinbefore, thus producing the corresponding 17-acylates (III and IV; R=acyl, $R^1 \neq H$).

The following specific examples serve to illustrate, but are not intended to limit the scope of the present invention.

PREPARATION 1

A solution of 5.2 grams of 19-nor testosterone in 50 cc. of glacial acetic acid and 50 cc. of ethyl acetate was placed in an ozonization tube cooled in an ice-salt bath. A current of ozone was introduced during 2 hours (0.024 mol per hour), then there were added 20 cc. of water and 3 cc. of 30% hydrogen peroxide and the mixture was vigorously stirred. The mixture was heated during half an hour in a steam bath and then was kept at room temperature during 48 hours.

The resulting solution was concentrated to small volume under reduced pressure in a steam bath, diluted with 20 cc. of methanol and poured into water. The mixture was extracted with ether, the extract washed with water, dried over anhydrous sodium sulfate and evaporated to dryness. The residue was chromatographed on 250 g. of alumina, thus giving 4,19-bisnor-3,5-seco-androstan-17β-ol-5-one-3-oic acid.

A solution of 2 g. of sodium borohydride in 30 cc. of methanol was added with stirring to a solution of 2 g. of the latter steroid in 40 cc. of tetrahydrofuran.

The mixture was maintained overnight at room temperature, the excess of the reaction was decomposed by addition of acetic acid, the solution concentrated to small volume in vacuo and diluted with water. The product was extracted with ethyl acetate, the extract washed with water, dried, and evaporated. Crystallization of the solid from acetone-hexane gave 4-oxa-19-nor-5α-androstan-17β-ol-3-one.

A mixture of 500 mg. of the latter compound, 10 cc. of dioxane and 850 mg. of 2,3-dichloro-5,6-dicyano-1,4-benzoquinone was refluxed during 50 hours. Then it was cooled, the 2,3-dichloro-5,6-dicyano-1,4-benzohydroquinone formed during the reaction was filtered off and the filtrate evaporated to dryness. The residue was dissolved in acetone and filtered through 10 g. of alumina. Crystallization from acetone-hexane gave 4-oxa-19-nor-$\Delta^1$-5α-androsten-17β-ol-3-one.

17α-methyl-19-nor-testosterone and 17α-ethinyl-19-nor-testosterone were treated by the procedures described above, giving respectively 17α-methyl-4-oxa-19-nor-$\Delta^1$-5α-androsten-17β-ol-3-one and 17α-ethinyl-4-oxa-19-nor-$\Delta^1$-5α-androsten-17β-ol-3-one.

PREPARATION 2

A solution of 1 g. of 17α-ethinyl-4-oxa-19-nor-$\Delta^1$-5α-androsten-17β-ol-3-one in 40cc. of pyridine, was hydrogenated at 25° C. and 170 mm. in the presence of 400 mg. of prehydrogenated 2% palladium on calcium carbonate catalyst.

When 1.1 molar equivalents of hydrogen were absorbed, the reaction was stopped, the catalyst separated by filtration through Celite, washed with ethyl acetate and the combined solutions were evaporated to dryness in vacuo, thus being obtained the crude vinyl derivative. This crude product was dissolved in ethyl acetate, the organic solution washed with dilute hydrochloric acid and water to neutral, dried and evaporated to dryness.

Recrystallization from acetone-hexane gave 17α-vinyl-4-oxa-19-nor-$\Delta^1$-5α-androsten-17β-ol-3-one.

Example I 5 g. of 4-oxa-19-nor-$\Delta^1$-5α-androsten-17β-ol-3-one in 200 cc. of carbon tetrachloride were refluxed with 1.1 molar equivalents of N-bromosuccinimide during one and a half hours. The mixture was filtered to eliminate the succinimide that was formed during the reactions. The filtrate was evaporated to dryness under reduced pressure. Recrystallization from methylene chloride-hexane gave 10β-bromo-4-oxa-19-nor-$\Delta^1$ - 5α - androsten-17β-ol-3-one (Compound No. 1).

1 g. of the above compound was refluxed with 1 g. of calcium carbonate and 50 cc. of dimethyl formamide for 30 minutes. The mixture was filtered, the solvent evaporated under reduced pressure and the residue crystallized from acetone-hexane to afford 4-oxa-19-nor-$\Delta^{1,5(10)}$-androstadien-17β-ol-3-one (Compound No. 2).

The compounds listed under I were treated by the foregoing procedure, giving firstly the corresponding 10β-bromo compounds and finally the products set forth under II.

| I | Cpd. | II |
|---|---|---|
| 17α-methyl-4-oxa-19-nor-$\Delta^1$-5α-androsten-17β-ol-3-one. | 3 | 17α-methyl-4-oxa-19-nor-$\Delta^{1,5(10)}$-androstadien-17β-ol-3-one. |
| 17α-vinyl-4-oxa-19-nor-$\Delta^1$-5α-androsten-17β-ol-3-one. | 4 | 17α-vinyl-4-oxa-19-nor-$\Delta^{1,5(10)}$-androstadien-17β-ol-3-one. |
| 17α-ethinyl-4-oxa-19-nor-$\Delta^1$-5α-androsten-17β-ol-3-one. | 5 | 17α-ethinyl-4-oxa-19-nor-$\Delta^{1,5(10)}$-androstadien-17β-ol-3-one. |

Example II

A mixture of 500 mg. of Compound No. 2, 10 cc. of dioxane and 350 mg. of 2,3-dichloro-5,6-dicyano-1,4-benzoquinone was refluxed during 10 hours. Then it was cooled, the 2,3-dichloro-5,6-dicyano-1,4-benzohydroquinone formed during the reaction was filtered off and the filtrate evaporated to dryness. The residue was dissolved in acetone and filtered through 10 g. of alumina. Crystallization from acetone-hexane gave 4-oxa-19-nor-$\Delta^{1,5(10),9(11)}$-androstatrien-17β-ol-3-one (Compound No. 6).

The Compounds Nos. 3, 4, and 5 were treated in the same manner, thus giving respectively:

Cpd. No.—
7. 17α-methyl-4-oxa-19-nor-$\Delta^{1,5(10),9(11)}$-androstatrien-17β-ol-3-one.
8. 17α-vinyl-4-oxa-19-nor-$\Delta^{1,5(10),9(11)}$-androstatrien-17β-ol-3-one.
9. 17α-ethinyl-4-oxa-19-nor-$\Delta^{1,5(10),9(11)}$-androstatrien-17β-ol-3-one.

Example III 2 cc. of dihydropyran were added to a solution of 1 g. of Compound No. 2 in 15 cc. of benzene and about 1 cc. was distilled to remove moisture. 0.4 g. of p-toluenesulfonic acid was added to the cooled solution, which was then allowed to stand at room temperature for 4 days. The solution was washed with sodium carbonate and water, dried and evaporated. The residue was chromatographed on 15 g. of neutral alumina. Crystallization of the fractions eluted with hexane from pentane yielded the 2-tetrahydropyranyl ether of 4-oxa-19-nor-$\Delta^{1,5(10)}$-androstadien-17β-ol-3-one (Compound No. 10).

The Compounds Nos. 3 to 9, inclusive, were treated by the same procedure thus giving respectively:

Cpd. No.—
11. The 2-tetrahydropyranyl ether of 17α-methyl-4-oxa-19-nor-$\Delta^{1,5(10)}$-androstadien-17β-ol-3-one.
12. The 2-tetrahydropyranyl ether of 17α-vinyl-4-oxa-19-nor-$\Delta^{1,5(10)}$-androstadien-17β-ol-3-one.
13. The 2-tetrahydropyranyl ether of 17α-ethinyl-4-oxa-19-nor-$\Delta^{1,5(10)}$-androstadien-17β-ol-3-one.
14. The 2-tetrahydropyranyl ether of 4-oxa-19-nor-$\Delta^{1,5(10),9(11)}$-andostatrien-17β-ol-3-one.
15. The 2-tetrahydropyranyl ether of 17α-methyl-4 - oxa-19-nor-$\Delta^{1,5(10),9(11)}$-androstatrien-17β-ol-3-one.
16. The 2-tetrahydropyanyl ether of 17α-vinyl-4 - oxa-19-nor-$\Delta^{1,5(10),9(11)}$-androstatrien-17β-ol-3-one.
17. The 2-tetrahydropyranyl ether of 17α-ethinyl-4 - oxa-19-nor-$\Delta^{1,5(10),9(11)}$-androstatrien-17β-ol-3-one.

Example IV

A mixture of 1 g. of Compound No. 2, 4 cc. of pyridine and 2 cc. of acetic anhydride was kept at room temperature overnight, poured into iced water, the formed precipitate filtered, washed with water and dried. Crystallization from acetone-hexane gave the acetate of 4-oxa-19 - nor - $\Delta^{1,5(10)}$ - androstadien-17β-ol-3-one (Compound No. 18).

The Compound No. 6 was treated in the same manner giving the acetate of 4-oxa-19-nor-$\Delta^{1,5(10),9(11)}$-androstatrien-17β-ol-3-one (Compound No. 19).

Example V

The starting compounds of the preceding example were treated in the manner described in said example, except that acetic anhydride was substituted by caproic propionic and enanthic anhydrides, giving respectively the corresponding caproates, propionates and enanthates.

Example VI

To a solution of 5 g. of compound No. 3 in 100 cc. of anhydrous benzene there were added 1 g. of p-toluenesulfonic acid and 10 cc. of caproic anhydride and the mixture was allowed to stand for 24 hours at room temperature, poured into ice water, and the resulting mixture stirred to effect hydrolysis of the excess anhydride. The benzene layer was separated and washed with 10% sodium carbonate solution and water. Drying, evaporation and crystallization of the residue from ether-hexane produced the caproate of 17α - methyl - 4 - oxa - 19-nor-$\Delta^{1,5(10)}$-androstadien-17β-ol-3-one (Compound No. 20).

The Compounds Nos. 4, 5, 7, 8 and 9, were treated in the same manner giving respectively:

Cpd. No.—
21. The caproate of 17α-vinyl-5-oxa-19-nor-Δ$^{1,5(10)}$androstadien-17β-ol-3-one.
22. The caproate of 17α-ethinyl-4-oxa-19-nor-Δ$^{1,5(10)}$androstadien-17β-ol-3-one.
23. The caproate of 17α-methyl-4-oxa-19-nor-Δ$^{1,5(10),9(11)}$-androstatrien-17β-ol-3-one.
24. The caproate of 17α-vinyl-4-oxa-19-nor-Δ$^{1,5(10),9(11)}$-androstatrien-17β-ol-3-one.
25. The caproate of 17α-ethinyl-4-oxa-19-nor-Δ$^{1,5(10),9(11)}$-androstatrien-17β-ol-3-one.

*Example VIII*

The starting compounds of Example VI were treated in accordance with said example, with the exception that caproic anhydride was substituted by acetic, propionic, enanthic and undecenoic anhydrides, giving respectively the corresponding acetates, propionates, enanthates and undecenoates.

I claim:
1. A compound of the following formula:

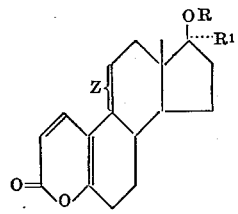

wherein R is selected from the group consisting of hydrogen, the tetrahydropyran-2-yl group and a hydrocarbon carboxylic acyl group of less than 12 carbon atoms; R$^1$ is a member of the group consisting of hydrogen, lower alkyl, lower alkenyl and lower alkinyl; and Z is selected from the group consisting of a saturated linkage and a double bond.

2. 4-oxa-19-nor-Δ$^{1,5(10)}$-androstadien-17β-ol-3-one.
3. 17α-methyl-4-oxa-19-nor-Δ$^{1,5(10)}$androstadien-17β-ol-3-one.
4. 17α-vinyl-4-oxa-19-nor-Δ$^{1,5(10)}$androstadien-17β-ol-3-one.
5. 17α-ethinyl-4-oxa-19-nor-Δ$^{1,5(10)}$androstadien-17β-ol-3-one.
6. 4-oxa-19-nor-Δ$^{1,5(10),9(11)}$-androstatrien-17β-ol-3-one.
7. 17α-methyl-4-oxa-19-nor-Δ$^{1,5(10),9(11)}$-androstatrien-17β-ol-3-one.
8. 17α-vinyl-4-oxa-19-nor-Δ$^{1,5(10),9(11)}$-androstatrien-17β-ol-3-one.
9. 17α-ethinyl-4-oxa-19-nor-Δ$^{1,5(10),9(11)}$-androstatrien-17β-ol-3-one.
10. The 2-tetrahydropyranyl ether of 4-oxa-19-nor-Δ$^{1,5(10)}$-androstadien-17β-ol-3-one.
11. The acetate of 4-oxa-19-nor-Δ$^{1,5(10)}$-androstadien-17β-ol-3-one.
12. The acetate of 4-oxa-19-nor-Δ$^{1,5(10),9(11)}$-androstatrien-17β-ol-3-one.
13. The caproate of 17α-methyl-4-oxa-19-nor-Δ$^{1,5(10)}$-androstadien-17β-ol-3-one.

References Cited by the Examiner
UNITED STATES PATENTS
2,973,370   2/1961   Atwater _____ 260—343.2

OTHER REFERENCES
Berkoz et al.: Proc. Chem. Soc. (July 1964), page 215.

WALTER A. MODANCE, *Primary Examiner.*
J. A. PATTEN, *Assistant Examiner.*